(12) United States Patent
Moldoveanu et al.

(10) Patent No.: US 10,809,403 B2
(45) Date of Patent: Oct. 20, 2020

(54) SURVEYING USING AN UNMANNED MARINE SURFACE VESSEL

(71) Applicant: WESTERNGECO LLC, Houston, TX (US)

(72) Inventors: Nicolae Moldoveanu, Houston, TX (US); Sudhir Pai, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 253 days.

(21) Appl. No.: 15/768,812

(22) PCT Filed: Oct. 4, 2016

(86) PCT No.: PCT/US2016/055235
§ 371 (c)(1),
(2) Date: Apr. 16, 2018

(87) PCT Pub. No.: WO2017/066028
PCT Pub. Date: Apr. 20, 2017

(65) Prior Publication Data
US 2018/0306941 A1 Oct. 25, 2018

Related U.S. Application Data

(62) Division of application No. 62/242,359, filed on Oct. 16, 2015.

(51) Int. Cl.
*G01V 1/38* (2006.01)
*B63B 35/00* (2020.01)
(Continued)

(52) U.S. Cl.
CPC ............ *G01V 1/3808* (2013.01); *B63B 35/00* (2013.01); *G01V 1/28* (2013.01); *G01V 1/282* (2013.01);
(Continued)

(58) Field of Classification Search
CPC ........ G01V 1/3817; G01V 3/12; G01V 1/282; G01V 1/3808; G01V 1/28; B63B 35/00; B63B 2035/007; B63B 2211/02
(Continued)

(56) References Cited

U.S. PATENT DOCUMENTS 4,970,697 A 11/1990 Earley et al.
7,411,863 B2 * 8/2008 Toennessen ......... G01V 1/3808
367/20

(Continued)

FOREIGN PATENT DOCUMENTS

WO 2015/113031 A1 7/2015

OTHER PUBLICATIONS

International Search Report and Written Opinion for the equivalent International patent application PCT/US2016/055235 dated Jan. 20, 2017.
(Continued)

*Primary Examiner* — Daniel L Murphy
(74) *Attorney, Agent, or Firm* — Fletcher Yoder, P.C.

(57) ABSTRACT

In some examples, an unmanned marine surface vessel connected to a three-dimensional array of sensors positioned are deployed in proximity with an obstruction area of a survey environment. The three-dimensional array of sensors positioned in proximity with the obstruction area of the survey environment records signals that are affected by a target structure.

22 Claims, 7 Drawing Sheets

(51) Int. Cl.
*G01V 1/28* (2006.01)
*G01V 3/12* (2006.01)

(52) U.S. Cl.
CPC .............. *G01V 1/3817* (2013.01); *G01V 3/12* (2013.01); *B63B 2035/007* (2013.01); *B63B 2211/02* (2013.01)

(58) Field of Classification Search
USPC .......................................................... 367/15
See application file for complete search history.

(56) References Cited

U.S. PATENT DOCUMENTS

| | | | |
|---|---|---|---|
| 2008/0285381 A1* | 11/2008 | Moldoveanu | G01V 1/3808 367/20 |
| 2011/0199863 A1 | 8/2011 | Frivik | |
| 2012/0069702 A1* | 3/2012 | Muyzert | G01V 1/3843 367/15 |
| 2012/0290164 A1* | 11/2012 | Hanson | B60F 5/00 701/23 |
| 2014/0078865 A1 | 3/2014 | Coste et al. | |
| 2015/0198731 A1 | 7/2015 | Muijzert et al. | |

OTHER PUBLICATIONS

International Preliminary Report on Patentability for the equivalent International patent application PCT/US2016/055235 dated Apr. 26, 2018.

\* cited by examiner

SURVEYING USING AN UNMANNED MARINE SURFACE VESSEL

CROSS-REFERENCE TO RELATED APPLICATION

This application claims the benefit under 35 U.S.C. § 119(e) of U.S. Provisional Application No. 62/242,359, entitled "Unmanned Vehicle Infill Seismic Surveying," filed Oct. 16, 2015, which is hereby incorporated by reference.

BACKGROUND

A survey data acquisition system can be used to acquire survey data of a target structure, such as a subsurface structure underneath an earth surface. The survey data acquisition system can include one or more survey sources and survey sensors. The one or more survey sources can generate survey signals that are directed into the target structure. Signals that are reflected from or otherwise affected by the target structure can be detected by the survey sensors, which can output measured survey data.

The measured survey data can be transmitted to a computer system for recording and analysis. The computer system can then process the measured survey data to characterize the target structure, such as by producing an image of the target structure, producing a model of the target structure, or producing other data that provides a representation of one or more parameters relating to the target structure.

BRIEF DESCRIPTION OF THE DRAWINGS

Some implementations of the present disclosure are described with respect to the following figures.

DETAILED DESCRIPTION

Reference will now be made in detail to some implementations, examples of which are illustrated in the accompanying drawings and figures. In the following description, numerous specific details are set forth in order to provide a thorough understanding of some example implementations. However, it will be apparent to one of ordinary skill in the art that the implementations may be practiced without these specific details.

It will also be understood that the terms first, second, etc., are used to distinguish one element from another, and does not specify any order of elements or tasks. As used in the description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some examples, a survey data acquisition system can include a seismic data acquisition system, which includes a seismic source (or multiple seismic sources) and a seismic sensor (or multiple seismic sensors). In other examples, a survey data acquisition system can include an electromagnetic (EM) data acquisition system, which includes an EM source (or multiple EM sources), and an EM sensor (or multiple EM sensors).

More generally, a survey data acquisition system can include a survey source (or multiple survey sources) and a survey sensor (or multiple sensors), where a sensor can acquire survey data of a target structure in response to signals emitted by the survey source(s). In some examples, the target structure can include a subsurface structure that is underneath an earth surface.

Although reference is made to surveying subsurface structures in the disclosure, it is contemplated that techniques or mechanisms according to some implementations can be applied to surveying of other types of target structures, such as mechanical structures, mammals, fish, or other structures.

In a marine acquisition system, survey source(s) and survey sensor(s) can be towed through a body of water. In some examples, survey sensors can be arranged on a marine streamer (or more simply "streamer") or multiple streamers. A streamer can be towed by a manned marine surface vessel. A manned marine surface vessel can refer to a marine surface vessel that is driven by a human located on the marine surface vessel. A marine surface vessel can refer to a vessel that is to be deployed on the top surface of a body of water, such as the sea surface. A manned marine surface vessel can tow one or more streamers. In some cases, multiple manned marine surface vessels can tow multiple streamers.

A marine environment can include various obstructions, such as marine platforms (where surface well equipment can be deployed to produce or inject fluids in a subsea well), marine surface facilities (to store or process fluids), natural formations, or any other designated region that may be sensitive to presence of equipment of a marine acquisition system.

An area of a survey environment that includes one or more obstructions can be referred to as an "obstruction area." An exclusion zone can be defined around the obstruction area, where the exclusion zone can have a larger area than the obstruction area. An exclusion zone is a zone in a survey environment where towed streamers towed by manned marine surface vessels are not allowed to enter (in other words, streamers are excluded from the exclusion zone). The exclusion of streamers is to avoid possible damage of certain structures (such as marine platforms, marine surface facilities, natural formations, etc.) due to collisions with the streamers. In other examples, there can be other reasons to exclude streamers (or other equipment of marine acquisition systems) from exclusion zones.

Because streamers cannot be towed through an exclusion zone during a survey acquisition operation, holes can be created in the coverage of the subsurface structure by measured survey data, due to the inability to acquire survey data using sensors deployed in the exclusion zone. In some cases, the exclusion zone can be located above a subsurface structure of interest, and holes that are created in the coverage of the measured survey data can lead to inaccurate characterizations of the subsurface structure based on the processing of the recorded survey data.

In some cases, additional shorter streamers can be deployed using an extra manned marine subsurface vessel, in an attempt to undershoot the obstruction area. Undershooting an obstruction area can refer to projecting survey data into the obstruction area using a streamer that is deployed outside the obstruction area. However, the shorter streamers have different designs from regular streamers, and using streamers of different designs to perform survey acquisition operations can be expensive because the streamer spread has to be reconfigured to have streamers of different designs.

In accordance with some implementations of the present disclosure, unmanned survey acquisition devices can be employed to acquire survey data in a survey environment that has an obstruction area. The unmanned survey acquisition device is allowed to enter the obstruction area or to be positioned close to the obstruction area (such as within an exclusion zone but outside the obstruction area). More generally, the unmanned survey acquisition device is able to be positioned closer to an obstruction area to acquire survey data than can a streamer.

An unmanned survey acquisition device includes sensors (e.g., seismic sensors and/or EM sensors) that can be used to record signals affected by a target structure, such as a subsurface structure. An unmanned survey acquisition device includes an unmanned marine surface vessel and an array of sensors (also referred to as a "sensor array") that is connected to the unmanned marine surface vessel. An unmanned marine surface vessel is a marine surface vessel that is not driven by a human that is located on the marine surface vessel. Rather, the unmanned marine surface vessel can be an autonomous marine surface vessel that is able to guide itself through a body of water, and/or that can be controlled remotely by a human that is located away from the marine surface vessel.

Figure 1:
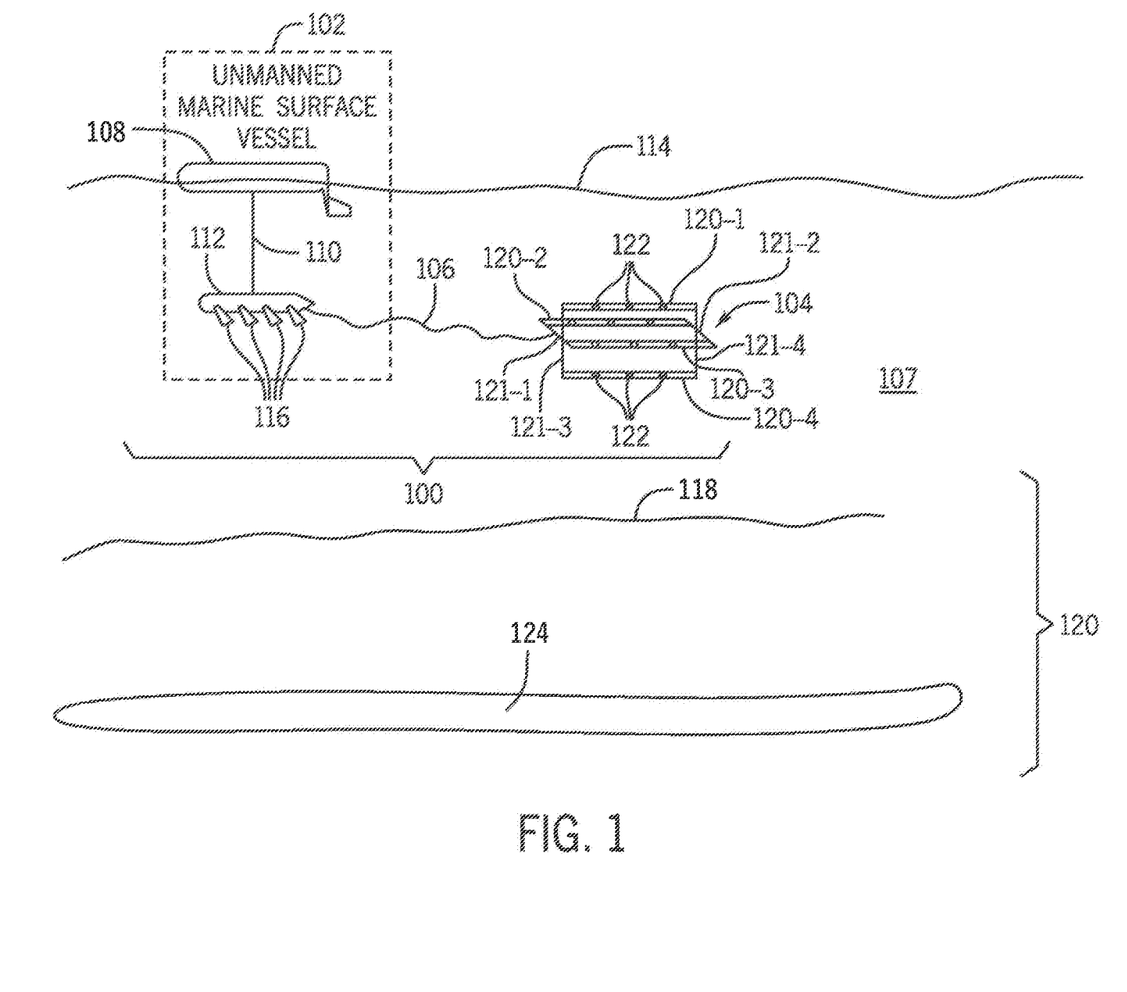
FIG. 1 is a schematic diagram of an example arrangement that includes an example unmanned survey acquisition device according to some implementations.

FIG. 1 is a schematic diagram showing an example of an unmanned survey acquisition device 100. The unmanned survey acquisition device 100 includes an unmanned marine surface vessel 102 and an array of sensors 104 (also referred to as a "sensor array) that is connected to the unmanned marine surface vessel over a tow cable 106. The unmanned marine surface vessel 102 tows the sensor array 104 through a body of water 107. The tow cable 106 can include communications lines to allow survey data acquired by sensors of the sensor array 104 to be communicated to the unmanned survey surface vessel 102.

In some examples, the tow cable 106 can be a motion-isolation tow cable. The motion-isolation tow cable 106 allows the sensor array 104 to remain stationary even though there is some small amount of motion of a stopped unmanned marine surface vessel 102.

The sensor array 104 can include a three-dimensional (3D) array of sensors. A 3D array of sensors is able to acquire survey data in 3D space. As shown in FIG. 1, the 3D array of sensors 104 includes multiple sensor supports 120-1, 120-2, 120-3, and 120-4. Each sensor support 120-$i$ ($i$=1 to 4) is generally a rigid elongated support, such as in the form of a rod in some examples. The rigid elongated supports can be formed of a rigid material, such as metal or other rigid material. Multiple sensors 122 can be mounted on each sensor support 120-$i$ and can be spaced apart from one another along the length of the sensor support 120-$i$. In some examples, multiple sensor supports 120-$i$ are arranged to be substantially parallel to one another, such as parallel along a horizontal axis or some other axis. Sensor supports are substantially parallel to one another if the sensor supports are parallel to within manufacturing or assembly tolerances of the sensor array 104, such as to within 10° of one another. The sensors 122 of the 3D array are spaced apart from another in three dimensions.

The sensor array 104 further includes additional rigid elongated supports 121-1, 121-2, 121-3, and 121-4 that interconnect respective pairs of the sensor supports 120-1, 120-2, 120-3, and 120-4. Each rigid elongated support 121-1, 121-2, 121-3, or 121-4 is substantially perpendicular to each rigid elongated support 120-$i$. Rigid elongated supports are substantially perpendicular to one another if the sensor supports are perpendicular to within manufacturing or assembly tolerances of the sensor array 104, such as to within 80°-100° of one another. Although not shown, one or more sensors 122 can also be mounted on each of one or more of the rigid elongated support 121-1, 121-2, 121-3, and 121-4.

Although a specific number of sensor supports 120-1 to 120-4 and 121-1 to 121-4 are shown in FIG. 1, it is noted that in other examples, a different number of sensor supports can be used.

In examples according to FIG. 1, the unmanned marine surface vessel 102 includes a glider float 108 that floats on a water surface 114 (e.g., sea surface or more generally the top surface of the body of water 107). The glider float 108 is connected by an umbilical structure 110 to a glider sub 112. The umbilical structure 110 mechanically couples the glider float 108 to the glider sub 112. Although the glider float 108 floats on the water surface 114, the glider sub 112 is positioned underneath the water surface 114. Additionally, communications lines can be run through the umbilical structure 110 to allow for communications between electronic components in the glider sub 112 and electronic components in the glider float 108.

In some examples, the glider float 108 is a wave glider float that is wave powered. The wave-powered glider float 108 is propelled by wave motion, i.e., the motion of the waves on the water surface 114. Wave motion is greater at the water surface 114, and decreases with increasing depth underneath the water surface 114. A rising wave lifts the glider float 108, causing the tethered (as attached by the umbilical structure 110) glider sub 112 to rise. Articulated wings 116 on the glider sub 112 are pressed down, and the upward motion of the glider sub 112 becomes an up-and-forward motion, which in turn pulls the glider float 108 forward and off a wave at the water surface 114. This in turn causes the glider sub 112 to drop, and the wings 112 to pivot upwardly, thereby causing the glider sub 112 to move down and forward.

Although reference is made to an unmanned marine surface vessel that is wave powered in some examples, it is noted that in other examples, the unmanned marine surface vessel can include a different type of propulsion mechanism to move the unmanned marine surface vessel 102 across the water surface 114. The different type of propulsion mechanism can include a propeller or other type of propulsion mechanism to cause forward motion of the unmanned marine surface vessel 102.

FIG. 1 also shows a water bottom surface 118, such as a sea bottom or sea bed. Underneath the water bottom surface 118 is a subsurface structure 120, which can include one or more subsurface elements 124 of interest, such as hydrocarbon reservoirs, water aquifers, specific geological formations, or any other structures.

Figure 2:
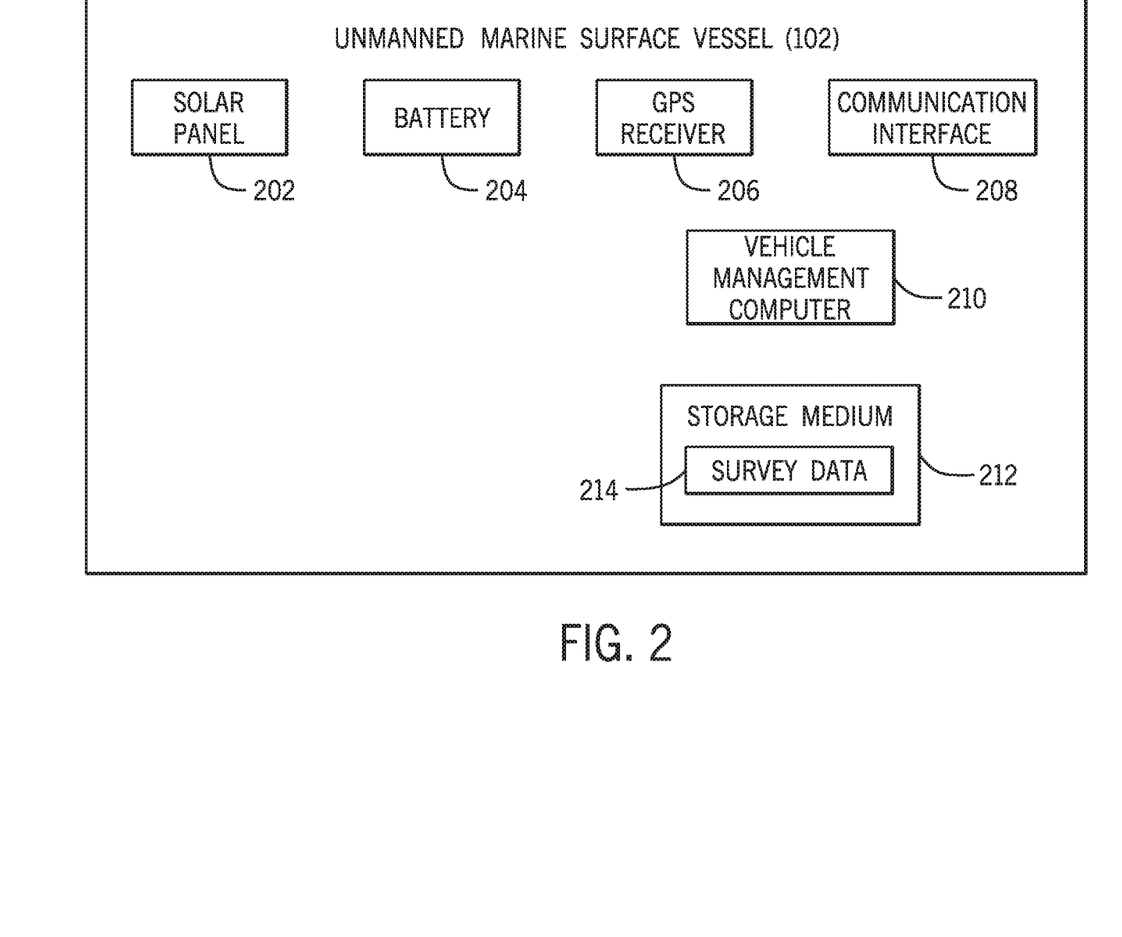
FIG. 2 is a block diagram of components in an unmanned marine surface vessel according to some implementations.

FIG. 2 is a block diagram of components in the unmanned marine surface vessel 102 according to some examples. More specifically, in examples where the unmanned marine surface vessel 102 includes the glider float 108 and the glider sub 112, the components shown in FIG. 2 can be part of the glider float 108.

The unmanned marine surface vessel 102 can include a power source (or multiple power sources). In examples according to FIG. 2, the power sources include a solar panel 202 and a battery 204. The solar panel 202 is used to convert solar energy into electrical power, which can be used to charge the battery 204 and to power other electronic components in the unmanned marine surface vessel 102. In other examples, different types of power sources can be used. Instead of a solar panel or a battery, a power source can instead be an engine that converts petroleum into power, or another type of power source.

The unmanned marine surface vessel 102 further includes a Global Positioning System (GPS) receiver 206, which is used to acquire GPS signals to use in determining a position of the unmanned marine surface vessel 102, and also to acquire timing information for synchronizing a clock of the unmanned marine surface vessel 102.

The unmanned marine surface vessel 102 can also include a communications interface 208, to allow for communications with a remote system, and also to the sensor array 104. In some examples, the communications interface 208 can include a wireless communications interface to perform wireless communications. For example, the communications interface 208 can be used to communicate with a satellite. In other examples, the communications interface 208 can include a radio frequency (RF) interface to perform RF communications.

The unmanned marine surface vessel 102 further includes a vehicle management computer 210 that is able to control motion of the unmanned marine surface vessel 102. The vehicle management computer 210 can control a path taken by the unmanned marine surface vessel 102 using any or some combination of the following: information from the GPS receiver 206, route information (which specifies a route to be taken by the unmanned marine surface vessel 102) programmed into the vehicle management computer 210, and/or control signals received from a remote source through the communications interface 208.

The unmanned marine surface vessel 102 further includes a storage medium 212 to store data, such as survey data 214 acquired by sensors of the sensor array 104 and transmitted to the unmanned marine surface vessel 102.

The unmanned marine surface vessel 102 is part of a mini-acquisition system in which the storage medium 212 can be used to store survey data 214. In further examples, the unmanned marine surface vessel 102 can include a real-time quality control (QC) capability.

Figure 3A:
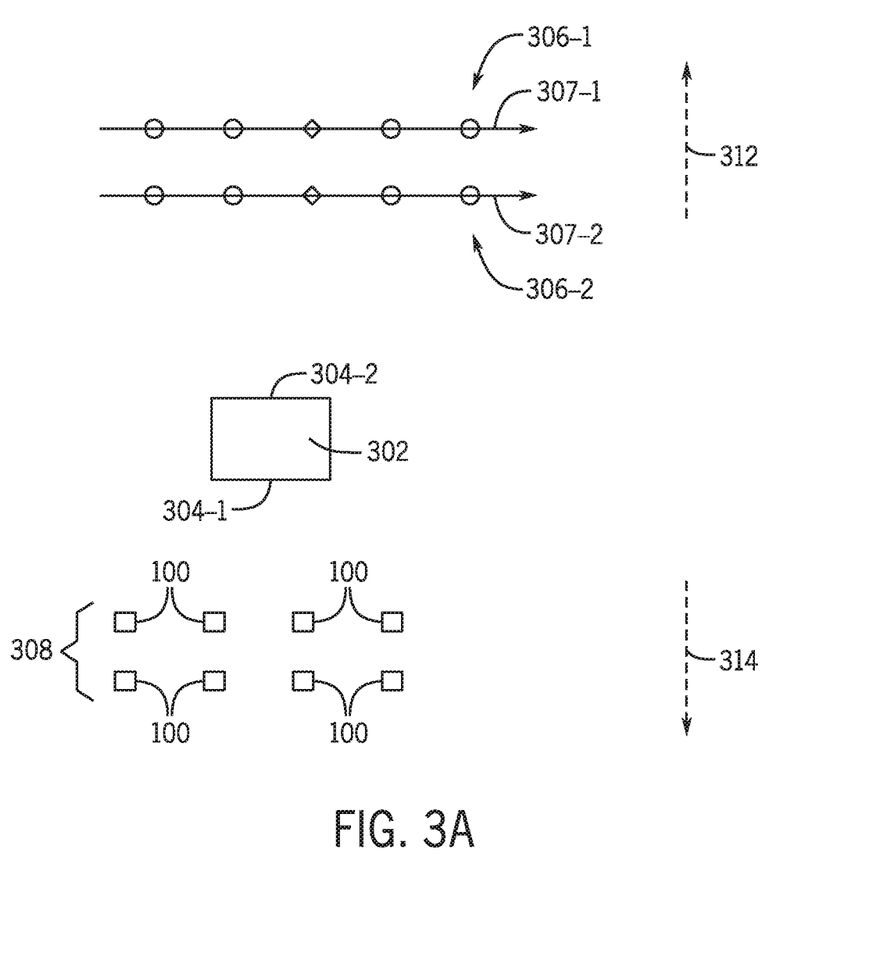
FIGS. 3A-3B and 4-7 are schematic diagrams of different example marine survey arrangements that include unmanned survey acquisition devices according to some implementations.

FIG. 3A is a top schematic view of a marine survey arrangement according to some examples. FIG. 3A shows an obstruction area 302 that can include one or more obstructions. FIG. 3A also shows an array 308 of unmanned survey acquisition devices 100 (generally in a grid pattern) deployed on a first side 304-1 of the obstruction area 302. FIG. 3A also shows streamers 306 deployed on a second side 304-2 of the obstruction area 302, where the second side 304-2 is opposite of the first side 304-1. The streamers 306-1 and 306-2 are towed by one or more manned marine surface vessels (not shown) along respective sail lines 307-1 and 307-2. A sail line indicates a direction of movement of a respective streamer.

Each streamer 306-1 or 306-2 includes survey sensors (indicated by circles) and survey source(s) (indicated by diamonds). Although FIG. 3A shows an example where a survey source and survey sensors are arranged on the same streamer, it is noted that in other examples, the survey source and survey sensors can be mounted on separate structures.

Although a specific number of streamers 306-1 and 306-2 are shown in FIG. 3A, it is noted that in other examples, a different number of streamers can be employed (e.g., one streamer or more than two streamers). Similarly, in other examples, a different number of unmanned survey acquisition devices 100 can be employed.

During operation, the survey source(s) can be activated (such as in response to a control signal sent from the manned marine surface vessel or from another entity, where activation of the survey source(s) causes the survey source(s) to emit survey signals into a subsurface structure, such as the subsurface structure 120 shown in FIG. 1. Signals affected by the subsurface structure (e.g., seismic signals reflected from the subsurface structure or EM signals that are affected by the subsurface structure) are detected by sensors on the streamers 306-1 and 306-2 as well as sensors of the unmanned survey acquisition devices 100.

As further shown in FIG. 3A, during a survey acquisition operation, the streamers 306-1 and 306-2 can be moved generally away from the second side 304-2 of the obstruction area 302, as indicated by an arrow 312. Similarly, the array 308 of unmanned survey acquisition devices 100 can be moved generally away from the first side 304-1 of the obstruction area 302, as indicated by arrow 314.

In further examples, the positions of the unmanned survey acquisition devices 100 relative to survey sources (e.g., survey sources placed on the streamer vessels or elsewhere) can be is defined to have the subsurface midpoints below and around the obstruction. The relative positions of the unmanned survey acquisition devices 100 and a survey source (which can be along a streamer vessel sail line) can be determined during survey planning using ray tracing or full finite difference modeling and imaging or other technique, to be sure that a subsurface target below and around an obstruction is properly illuminated (i.e., survey data is obtained corresponding to positions of a subsurface target below and around an obstruction).

The path taken by each streamers 306-1 or 306-2 can be a coil path (which is a generally circular or oval path) that moves generally away from the obstruction area 302 in some examples. In other examples, each streamer 306-1 or 306-2 can take a different path.

Figure 3B:
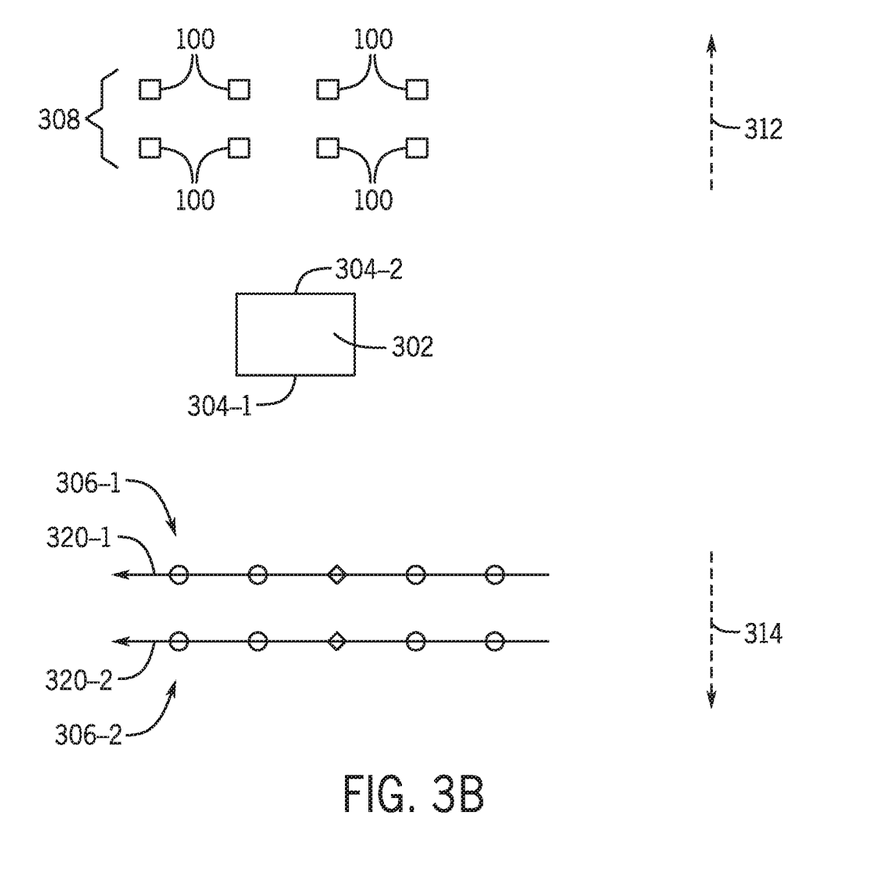

FIG. 3B shows a different example marine survey arrangement. As shown in FIG. 3B, the array 308 of unmanned survey acquisition devices 100 can be deployed on the second side 304-2 of the obstruction area 302, and the streamers 306-1 and 306-2 can be deployed on the first side 304-1 of the obstruction area 302. In FIG. 3B, the streamers 306-1 and 306-2 can move generally along respective sail lines 320-1 and 320-2, which are in a direction opposite the direction of sail lines 307-1 and 307-2 of FIG. 3A.

In FIG. 3B, during a survey acquisition operation, the streamers 306-1 and 306-2 can be moved generally away from the first side 304-1 of the obstruction area 302, as indicated by an arrow 314, and the array 308 of unmanned survey acquisition devices 100 can be moved generally away from the second side 304-2 of the obstruction area 302, as indicated by arrow 312.

Generally, in the example of FIG. 3A or 3B, the array 308 of unmanned survey acquisition devices 100 are arranged on one side of the obstruction area 302 opposite the side of the obstruction area 302 on which one or more survey sources are arranged. The array 308 of unmanned survey acquisition devices 100 are positioned outside the obstruction area 302, but in close proximity to the obstruction area 302.

Note that in each of FIG. 3A or 3B, the streamers 306-1 and 306-2 are outside an exclusion zone that includes the obstruction area 302, while the array 308 of unmanned survey acquisition devices 100 can be inside the exclusion zone.

In further examples, some unmanned survey acquisition devices 100 can be deployed inside the obstruction area 302 in the FIG. 3A or 3B arrangement.

Figure 4:
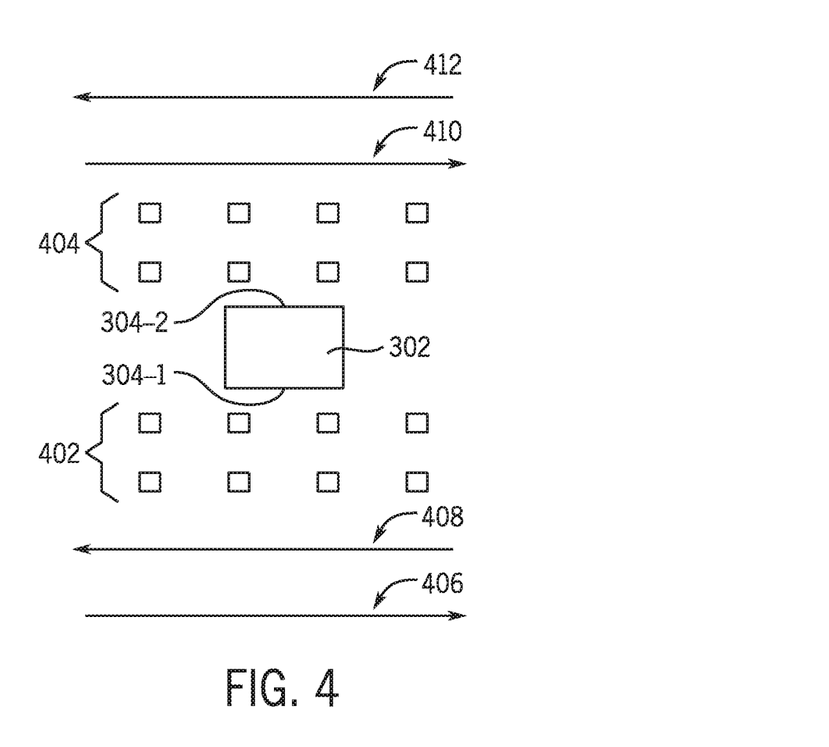

FIG. 4 is a schematic top view of a different marine survey arrangement, which shows a first array 402 of unmanned survey acquisition devices 100 on the first side 304-1 of the obstruction area 302, and a second array 404 of unmanned survey acquisition devices 100 on the second side 304-2 of the obstruction area 302. In addition, streamers 406 and 408 can be towed along respective sail lines (indicated by respective arrows) on the first side 304-1 of the obstruction area 302. The streamers 406 and 408 are located farther away from the obstruction area 302 than the array 402 of unmanned survey acquisition devices 100.

Similarly, streamers 410 and 412 can be towed along respective sail lines (indicated by respective arrows) on the second side 304-2 of the obstruction area 302. The streamers 410 and 412 are located farther away from the obstruction area 302 than the array 404 of unmanned survey acquisition devices 100.

Thus, generally, in the FIG. 4 arrangement, unmanned survey acquisition devices 100 are provided on both sides 304-1 and 304-2 of the obstruction area 302, and a streamer (or multiple streamers) is (are) towed also along both sides of the obstruction area 302. More generally, in FIG. 4, unmanned survey acquisition devices 100 are provided on both sides 304-1 and 304-2 of the obstruction area 302, and a survey source (or survey sources) is (are) also positioned on both sides of the obstruction area 302.

The streamers 406, 408, 410, and 412 are outside an exclusion zone that includes the obstruction area 302, while the arrays 402 and 404 of unmanned survey acquisition devices 100 (or portions of the arrays 402 and 404) can be deployed inside the exclusion zone.

Figure 5:
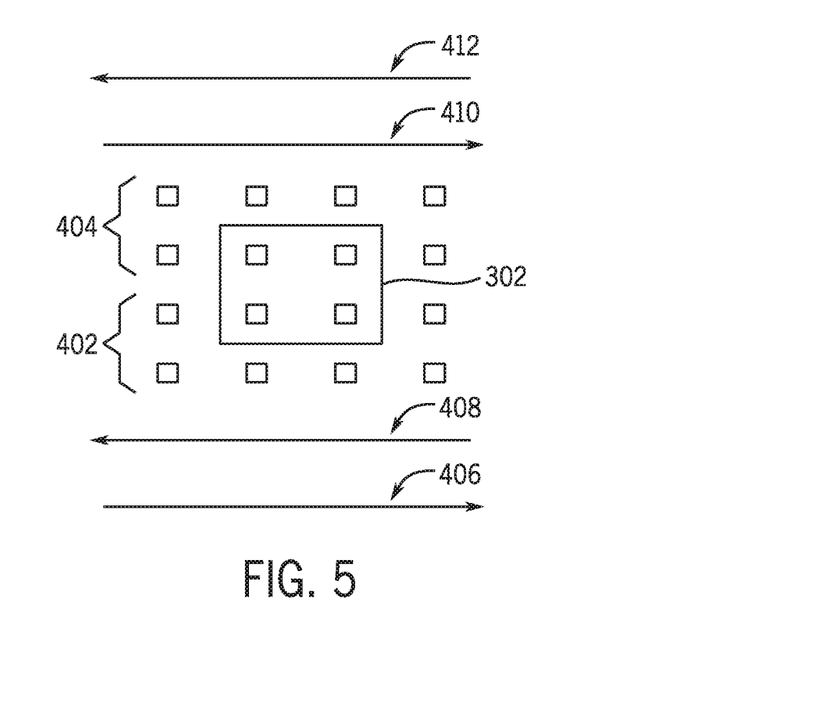

FIG. 5 is a schematic top view of another example arrangement, which is similar to the FIG. 4 arrangement, except a subset of the unmanned survey acquisition devices 100 of the arrays 402 and 404 are located inside the obstruction area 302.

Figure 6:
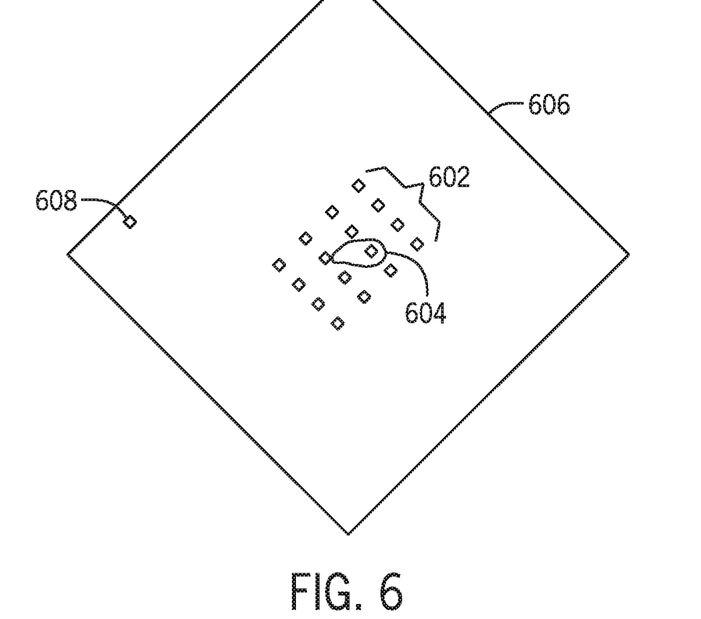

FIG. 6 shows a different marine survey arrangement, which has a grid 602 of unmanned survey acquisition devices 100 provided in and around an obstruction area 604. In addition, an outer box 606 represents a shot grid where activations of a survey source(s) 608 occur, as the survey source(s) 608 is (are) towed through the area inside the outer box 606.

Figure 7:
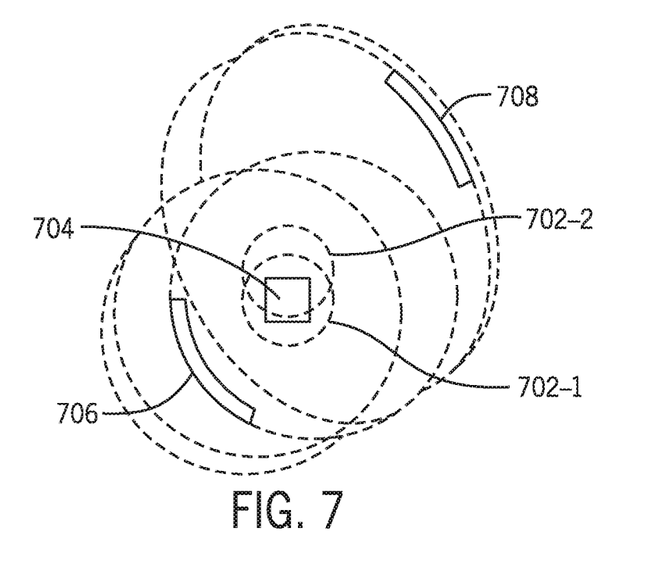

FIG. 7 shows another example marine survey arrangement, which shows an arrangement 702-1 of unmanned survey acquisition devices 100 in a circular pattern around an obstruction area 704. A circular pattern can refer to an arrangement of unmanned survey acquisition devices 100 around a circle, an ellipse, or any other loop of any shape.

In addition, a dual coil type acquisition pattern is provided by streamers 706 and 708, which can be towed in generally circular paths to provide coil patterns. A dual coil type acquisition refers to acquisition performed by two streamers, which in the case of FIG. 7 are the streamers 706 and 708.

The arrangement 702-1 of unmanned survey acquisition devices 100 can move between different circular patterns, such as to circle 702-2, as shown in FIG. 7 to perform different acquisitions. Thus, after the arrangement of unmanned survey acquisition devices 100 has acquired survey data in a first time interval, the arrangement of unmanned survey acquisition devices 100 can move to a different circle to acquire survey data in a second time interval. The number of circular patterns of the unmanned survey acquisition devices 100 can be determined as a function of offset ranges that are to be used to perform infilling of holes in survey data acquired by a streamer (or multiple streamers). Infilling a hole can refer to providing survey data at a position where a regular streamer (or streamers) is (are) unable to acquire data due to restrictions associated with an obstruction area.

In each of the various example implementations discussed above, deploying unmanned survey acquisition devices 100 inside and outside an obstruction area allows for acquisition of short-range, mid-range offsets, and/or long and ultra-long offsets. An offset refers to a distance between a survey source and a survey sensor when the survey source was activated and the survey sensor acquired survey data responsive to the activation of the survey source.

In each of the various example implementations, if there are multiple obstruction areas, the unmanned survey acquisition devices 100 can be moved from one obstruction area to another obstruction area after survey acquisition is performed. The unmanned survey acquisition devices 100 can move from one obstruction area to another obstruction area, such that survey data can be acquired continually with no retrieval and re-deployment of the unmanned survey acquisition devices 100 having to be performed. One manned marine surface vessel and a number of unmanned survey acquisition devices 100 can be used to acquire data around obstruction areas, which can be performed independently of survey data acquired by streamers.

In accordance with some implementations of the present disclosure, by acquiring survey data using unmanned survey acquisition devices, various benefits can be achieved. For example, the survey acquisition cost can be reduced by using the unmanned survey acquisition devices 100 instead of modified-design streamers for obstruction areas. In addition, the unmanned survey acquisition devices can be used to acquire near, mid, long, and ultra-long offsets, to perform infilling.

The survey data acquired by the 3D sensor arrays of the unmanned survey acquisition devices 100 are of the same type as sensors of towed streamers, and thus the processing of the survey data acquired by the streamers and 3D sensor arrays can be performed together by a processing system (e.g., a remote computer system), such as to produce an image of a subsurface structure, a model of a subsurface structure, or to provide a different representation that characterizes elements in the subsurface structure.

Figure 8:
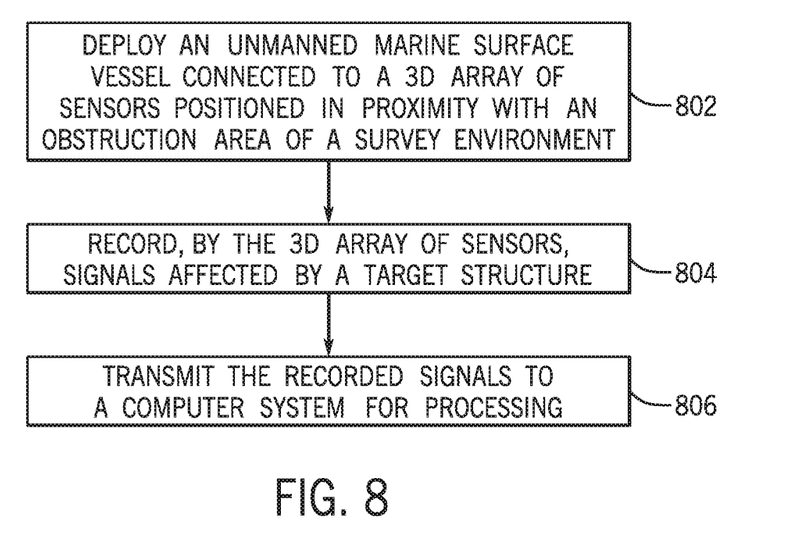
FIG. 8 is a flow diagram of an example process for acquiring survey data, according to some implementations.

FIG. 8 is a flow diagram of a general process of marine surveying, in accordance with some implementations. The process includes deploying (at 802) an unmanned marine surface vessel (e.g., 102 in FIG. 1) connected to a 3D array of sensors (e.g., 104 in FIG. 1) positioned in proximity with an obstruction area of a survey environment. The 3D array of sensors is positioned in proximity with the obstruction area if any one or more of the sensors of the 3D array are inside the obstruction area and/or within a specified distance of the obstruction area, where the specified distance is determined as a function of an offset range (range of offsets between a survey source and a survey sensor) that is to be used for infilling holes in survey data acquired by a streamer(s).

The process further includes recording (at 804), by the 3D array of sensors positioned in proximity with the obstruction area, signals that are affected by a target structure. The recorded signals can subsequently be transmitted (at 806) to a computer system, which processes the recorded signals to produce a representation of the target structure, including one or more parameters that characterize element(s) in the target structure. The representation can include an image of the target structure or a model of the target, as examples.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of marine surveying, comprising:
deploying an unmanned marine surface vessel connected to a three-dimensional array of sensors positioned in a proximity of an obstruction area of a survey environment, the three-dimensional array of sensors comprising a plurality of rigid elongated supports, wherein a plurality of sensors of the three-dimensional array of sensors are mounted on a respective rigid elongated support of the plurality of rigid elongated supports, and the plurality of sensors of the three-dimensional array of sensors is spaced apart from another in three dimensions, and wherein a portion of the plurality of rigid elongated supports is substantially parallel to one another; and
recording, by the three-dimensional array of sensors positioned in the proximity of the obstruction area of the survey environment, a plurality of signals that is affected by a target structure, wherein the plurality of signals is recorded by the three-dimensional array of sensors deployed on an opposite side of a survey source with respect to the obstruction area, and wherein only the plurality of signals is used to infill holes in recorded data by an additional plurality of sensors on a marine streamer that is unable to be deployed in the obstruction area.

2. The method of claim 1, wherein an additional portion of the plurality of rigid elongated supports is substantially perpendicular to one another.

3. The method of claim 1, further comprising:
activating the survey source to emit a plurality of source signals,
wherein the plurality of signals is responsive to the plurality of source signals.

4. The method of claim 3, wherein activating the survey source comprises activating a seismic source to emit a plurality of seismic signals, or activating an electromagnetic source to emit a plurality of electromagnetic signals.

5. The method of claim 3, further comprising:
deploying the survey source on a first side of the obstruction area,
wherein the unmanned marine surface vessel and the three-dimensional array of sensors are positioned on a second side of the obstruction area opposite the first side, and the recording is performed by the three-dimensional array of sensors positioned on the second side of the obstruction area with the survey source activated while positioned on the first side of the obstruction area.

6. The method of claim 3, further comprising:
wherein the unmanned marine surface vessel and the three-dimensional array of sensors are positioned in the obstruction area, and the recording is performed by the three-dimensional array of sensors positioned in the obstruction area.

7. The method of claim 3, further comprising:
wherein the unmanned marine surface vessel and the three-dimensional array of sensors are positioned in an exclusion zone that includes the obstruction area, wherein a towed marine streamer is prohibited from entering the exclusion zone, and the recording is performed by the three-dimensional array of sensors positioned in the exclusion zone.

8. The method of claim 1, wherein the unmanned marine surface vessel comprises an unmanned wave powered surface marine vessel.

9. The method of claim 1, further comprising:
deploying a plurality of unmanned marine surface vessels connected to respective three-dimensional arrays of sensors positioned in the proximity of the obstruction area of the survey environment; and
recording, by the three-dimensional arrays of sensors positioned in the proximity of the obstruction area of the survey environment, an additional plurality of signals that are affected by the target structure.

10. The method of claim 9, further comprising deploying the plurality of unmanned marine surface vessels connected to the respective three-dimensional arrays of sensors in a first circular pattern, the method further comprising:
after recording a first set of signals with the plurality of unmanned marine surface vessels connected to the respective three-dimensional arrays of sensors arranged in the first circular pattern, moving the plurality of unmanned marine surface vessels connected to the respective three-dimensional arrays of sensors to a second circular pattern; and
recording a second set of signals by the three-dimensional arrays of sensors arranged in the second circular pattern.

11. The method of claim 1, further comprising:
deploying the marine streamer towed by a manned marine surface vessel; and
recording, by the additional plurality of sensors on the marine streamer, an additional plurality of signals affected by the target structure.

12. The method of claim 1, further comprising determining, during survey planning, one or more relative positions of the unmanned marine surface vessel connected to the three-dimensional array of sensors and the survey source, to provide illumination of a subsurface target below and around the obstruction area.

13. A survey acquisition system comprising:
an unmanned marine surface vessel;
a three-dimensional array of sensors connected to the unmanned marine surface vessel and positioned in a proximity of an obstruction area of a survey environment, the three-dimensional array of sensors comprising a plurality of rigid elongated supports, wherein a plurality of sensors of the three-dimensional array of sensors is mounted on a respective rigid elongated support of the plurality of rigid elongated supports, and the plurality of sensors of the three-dimensional array of sensors is spaced apart from another in three dimensions, and wherein a portion of the plurality of rigid elongated supports is substantially parallel to one another, and an additional portion of the plurality of rigid elongated supports is substantially perpendicular to one another, the three-dimensional array of sensors positioned in the proximity of the obstruction area of the survey environment to record a plurality of signals that is affected by a target structure, wherein the plurality of signals is recorded by the three-dimensional array of sensors deployed on an opposite side of a survey source with respect to the obstruction area, and wherein only the plurality of signals is used to infill holes in recorded data by an additional plurality of sensors on a marine streamer that is unable to be deployed in the obstruction area.

14. The survey acquisition system of claim 13, wherein the unmanned marine surface vessel is an unmanned wave powered surface marine vessel.

15. The survey acquisition system of claim 13, wherein another rigid elongated support of the plurality of rigid elongated supports comprises a set of sensors.

16. The survey acquisition system of claim 13,
wherein the survey source is deployed on a first side of the obstruction area,
wherein the unmanned marine surface vessel and the three-dimensional array of sensors are to deploy on a second side of the obstruction area, the second side opposite from the first side.

17. The survey acquisition system of claim 13, wherein the unmanned marine surface vessel and the three-dimensional array of sensors are part of a first unmanned survey acquisition device, the survey acquisition system further comprising:
a second unmanned survey acquisition device comprising a second unmanned marine surface vessel, and a second three-dimensional array of sensors connected to the second unmanned marine surface vessel.

18. The survey acquisition system of claim 17, wherein the first unmanned survey acquisition device is to deploy outside the obstruction area, and the second unmanned survey acquisition device is to deploy inside the obstruction area.

19. The survey acquisition system of claim 17, wherein the first and second unmanned survey acquisition devices are part of an arrangement of unmanned survey acquisition devices, the unmanned survey acquisition devices of the arrangement provided in a grid pattern or a circular pattern.

20. The survey acquisition system of claim 19, wherein the arrangement of unmanned survey acquisition devices is moveable from the obstruction area to another obstruction area.

21. An unmanned survey acquisition device comprising:
a wave powered glider that is moveable using power derived from waves of a water surface;
a three-dimensional array of sensors positioned in a proximity of an obstruction area of a survey environment and configured to acquire survey data for a target structure underneath the obstruction area, the three-dimensional array of sensors comprising a plurality of rigid elongated supports, wherein a plurality of sensors of the three-dimensional array of sensors is mounted on a respective rigid elongated support of the plurality of rigid elongated supports, and the plurality of sensors of the three-dimensional array of sensors are spaced apart from another in three dimensions, and wherein a portion of the plurality of rigid elongated supports is substantially parallel to one another, and an additional portion of the plurality of rigid elongated supports is substantially perpendicular to one another; and
a tow line to connect the wave powered glider and the three-dimensional array of sensors.

22. The unmanned survey acquisition device of claim 21, wherein the wave powered glider comprises a solar panel to derive energy from solar power, and a computer to navigate the wave powered glider.

* * * * *